July 30, 1968 F. M. BRAUER 3,395,361

ADAPTIVE GAIN CONTROL FOR A DIGITALLY CONTROLLED FREQUENCY SYNTHESIZER

Filed Aug. 30, 1967

INVENTOR.
FRANK M. BRAUER

BY Charles M. Hogan
Irwin P. Garfinkle
ATTORNEYS.

3,395,361

ADAPTIVE GAIN CONTROL FOR A DIGITALLY CONTROLLED FREQUENCY SYNTHESIZER

Frank M. Brauer, Cincinnati, Ohio, assignor to Avco Corporation, Cincinnati, Ohio, a corporation of Delaware
Filed Aug. 30, 1967, Ser. No. 664,423
7 Claims. (Cl. 331—14)

ABSTRACT OF THE DISCLOSURE

When a variable frequency oscillator is going too fast or too slow, a polarized error signal representing the error in frequency is generated during discrete periods of time through a first or second gate. The error signal of one polarity passing through the first gate represents the "advance" error when the oscillator is going too slow, and the error signal of opposite polarity passing through from the second gate presents the "retard" error when the oscillator is going too fast. Advance and retard error signals are used in a servo control loop to correct the frequency of operation of the oscillator. The error signals are sampled over a sampling period and the number of times the error is positive and negative is counted, and the counted numbers are compared. If the difference between these numbers exceeds a predetermined level, the gain of the control loop is adjusted as a function of the difference.

*Summary of the invention*

Figures 1, 2:
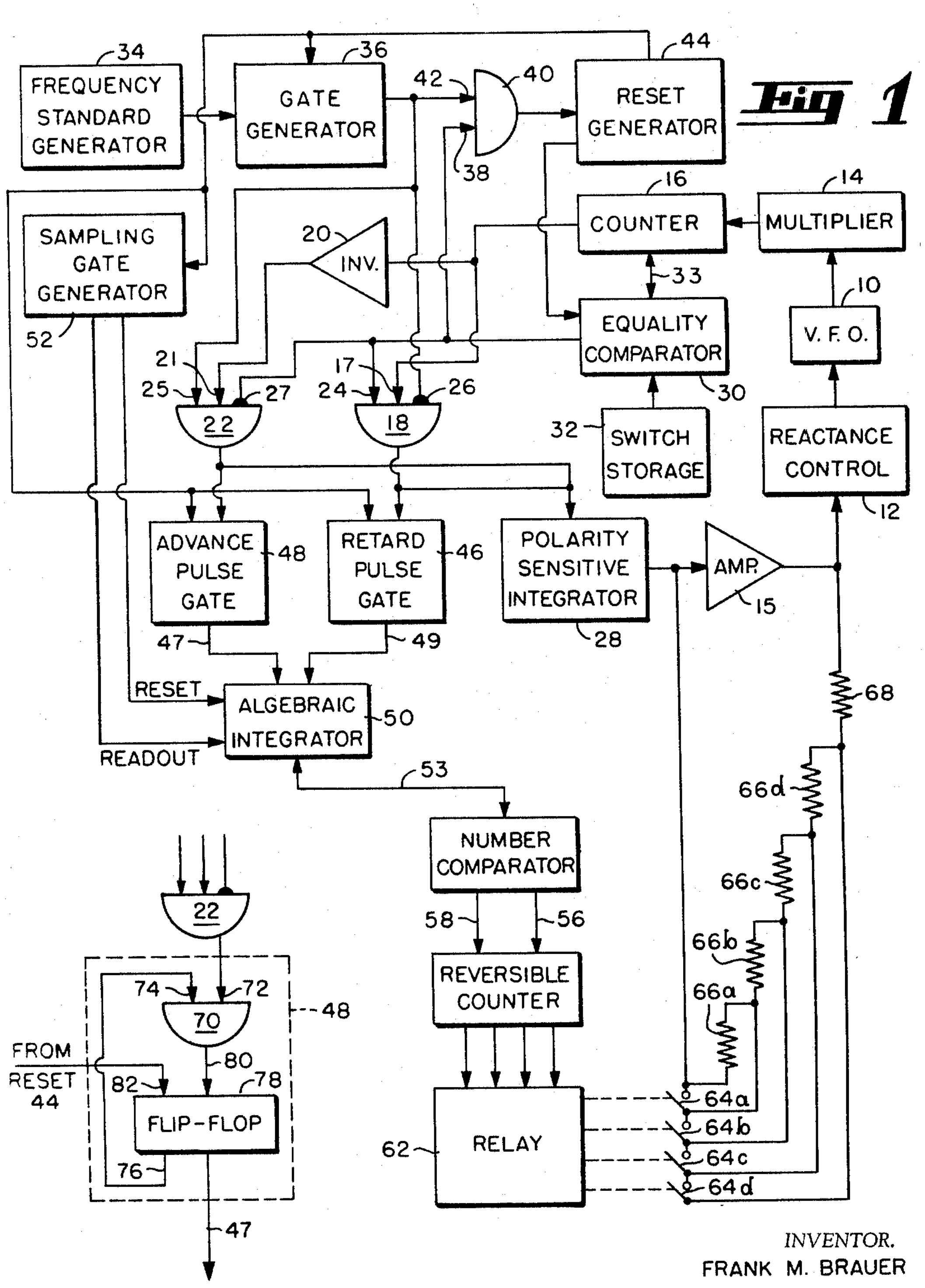

This invention provides for the automatic evaluation of the types of corrections being made by a digital servo system for appropriately adjusting the servo loop gain so as to improve the overall performance of the servo system.

The invention is described in combination with my prior invention disclosed in U.S. Patent 3,259,851 issued July 16, 1966, and assigned to the same assignee as this invention. In the patent the output from each of two gates is applied to a polarity-sensitive integrator which in turn controls the reactance of a variable frequency oscillator. The output of one gate is positive, representing an error in one direction, while the output from the other gate is negative, representing an error in the opposite direction. The present invention represents an improvement over the patent in that I count for a given period of time the number of times the error is positive and the number of times it is negative. I then control the gain of the servo loop to increase or decrease the servo loop response as a function of the difference between the number of positive and negative counts.

The output of each gate is continuously monitored by an advance pulse gate and a retard pulse gate, respectively. These gates pass a single advance or retard pulse for each train of pulses of a given polarity applied thereto. The advance and retard pulses are algebraically summed, and the summation is applied to a comparator. If during any sample period the result is net advance or a net retard, the comparator so indicates, and the comparator output adjusts the characteristics of the servo loop in such a manner that the gain is automatically adapted to the instantaneous requirements of the system.

The patented disclosure, which is directed to a fine frequency control, also requires a coarse frequency control. The adaptive gain control feature provided by this invention automatically and continuously adjusts the loop gain characteristics of the system, so that in many cases the need for coarse frequency control may be eliminated.

The present invention is an improvement over systems of the type shown in my prior U.S. Patent 3,259,851 because of the following advantages which result:

(1) It permits the elimination of coarse tuning of the voltage controlled oscillator by a remote analog voltage, thus dispensing with shielded wiring from a remote control box. In the present case, all control data may be entirely digital.

(2) It can operate in combination with very crude coarse tuning in cases where the VFO covers an extremely wide range of frequencies. Under these circumstances some analog control would be necessary.

(3) In any event the improvement reduces the interval or offset error due to loop gain variation.

(4) The improvement speeds up the fine adjustment by providing a high servo loop gain for large errors and a small servo loop gain for small errors.

*The drawings*

FIGURE 1 is a block diagram illustrating the general principles of the invention; and FIGURE 2 illustrates logic of the advance and retard pulse gates 46 and 48.

*Description of FIGURE 1*

The detailed operation of the synthesizer is set forth in U.S. Patent 3,259,851, and that disclosure is incorporated herein by reference. For convenience, however, the patented disclosure, as shown in FIGURE 1, is summarized herein.

The variable frequency oscillator 10 is conventional. The purpose of the prior system, and the present system as well, is to derive from the output of the VFO 10 a very large number of highly stabilized frequencies. For this purpose the VFO 10 is set to a fine frequency setting by means of a voltage-sensitive reactance control device 12. A coarse frequency setting may be required depending on the system parameters.

A portion of the output from the oscillator 10 is applied through a multiplier 14 to a counter 16 having conventional binary counting circuits.

The output from the counter 16, which constitutes a series of pulses of one polarity having a repetition rate equal to the multiplier frequency, is supplied directly to a terminal 17 of a first AND gate 18 and through a polarity inverter 20 to the terminal 21 of a second AND gate 22. For the purposes of the present invention, the gate 18 is characterized as a "retard" gate, since its output serves to retard or slow the VFO 10, while the gate 22 is characterized as an "advance" gate since its output advances or speeds up the VFO. The AND gates 18 and 22 are each provided with a second terminal 24 and 25, respectively, and with inhibit terminals 26 and 27, respectively. For each pulse applied to the counter 16, a pulse appears in its output and is passed through gates 18 or 22, provided an appropriate signal has been applied to the second terminals 24 and 25, and further provided that the gates are uninhibited at the inhibit terminals 26 and 27, respectively. The retard or advance output pulses of gates 18 and 22 are then applied to a polarity-sensitive integrator 28 which serves to drive the reactance control device 12 in the input circuit of the variable frequency oscillator 10. In the present improved system, the output of integrator 28 is applied to the reactance control device 12 through a variable gain amplifier 15. By varying the gain of amplifier 15, the gain of the servo loop is varied, and hence its rate is adaptable.

The AND gates 18 and 22 are controlled by (1) an equality comparator 30, the operating frequency of which is established by a switch storage device 32, and (2) a frequency standard generator 34 which controls a gate generator 36, the output of which is a pulse having a predetermined duration. Connections from the binary circuits on the counter 16 through a plurality of lines (indicated at 33) to the binaries in the comparator 30, permit a comparison of the desired frequency which is preset into the comparator 30 by the switch storage device 32 with the actual count of the counter 16. In essence, the device 32 commands a count of the preset number of cycles which should be developed. When that number is counted by the counter 16, the comparator output changes state. The output voltage of the equality comparator 30 is applied to both AND gates, at the second terminal 24 of AND gate 18 and at the inhibitor 27 of AND gate 22.

The output voltage from the gate generator 36 is also applied to both AND gates, at the first terminal 25 of AND gate 22, and at the inhibitor 26 of AND gate 18.

One condition of the output of the equality comparator 30, for example "1," serves to inhibit the AND gate 22 but serves to enable the AND gate 18. On the other hand, a gate voltage (for example "1") from the gate generator 36 serves to inhibit the AND gate 18 but serves to enable the AND gate 22. If the AND gate 18 is uninhibited before the AND gate 22, the pulses of one polarity are applied to the polarity-sensitive integrator 28. On the other hand, if AND gate 22 is uninhibited first, then pulses of an opposite polarity are applied to the polarity-sensitive integrator 28.

If the variable frequency oscillator 10 is at exactly the frequency set into the equality comparator 30 (taking into account the multiplication at multiplier 14), the period of time for counting the frequency set into the comparator will be exactly equal to the time period of the gate output of the gate generator 36. Under these conditions both gates would each be inhibited and no error votlage is developed. If the variable frequency oscillator 10 is running too fast, then counter 16 reaches equality too soon and comparator 30 changes state before the time gate expires. This develops "retard" output pulses from AND gate 18. If the variable frequency oscillator is going too slow, the time gate of the gate generator 36 terminates prior to the filling of the counter 16 and the AND gate 22 is enabled to develop "advance" output pulses of an opposite polarity. Thus, the polarity-sensitive integrator 28 is provided with no error output if no frequency error exists, or with a number of pulses equal to the actual error.

To reset the apparatus, the output of the equality comparator 30 is connected to one terminal 38 of an AND gate 40, while the output from gate generator 36 is connected to the second terminal 42. An output is developed from the AND gate 40 when both the gate generator 36 and the equality comparator 30 change state. The output from the AND gate 40 is applied to a reset generator 44 which serves to reset both the gate generator 36 and the counter 16.

*The improvement*

In the prior patent the output of the gates 18 and 22 consisted of a train of positive and negative pulses, respectively. The number of pulses represented the magnitude of the error, and the polarity represented the direction. The gain of the servo loop was relatively constant, or in any event the gain variations had no advantageous relationship to the error signal. This invention provides adaptive gain control in that it adjusts the gain of the servo loop as a function of the types of corrections. The retard pulse output from AND gate 18 results from the variable frequency oscillator 10 running too fast, and therefore the train of retard pulses retards or slows the VFO. Similarly, the advance pulse output from the AND gate 22 indicates that the VFO is going too slowly, and these trains of pulses are used to advance or speed the VFO. The present improvement provides a "retard" pulse gate 46 and an "advance" pulse gate 48, which each passes one advance or retard pulse for each train of pulses applied to it. This function may be accomplished by any conventional means or by means of the arrangement illustrated in FIGURE 2 (hereinafter to be described).

Each output pulse developed in the advance and retard pulse gates 46 and 48 is applied, respectively at lines 47 and 49 to an algebraic integrator 50. The algebric integrator is digital and its binary output circuits provide a binary number representing the difference between the number of pulses applied from the gates 46 and 48 over a predetermined sampling period.

The duration of the sampling periods is established by a sampling gate pulse generated by a sample gate generator 52. The sampling gate pulse is initiated by the leading edge of a pulse from reset generator 44, but has a duration which may be ten times as long as the gate generated by the gate generator 36. Therefore, the advance and retard correction gates 46 and 48 together may pass ten retard or advance pulses.

The leading edge of the pulse generated by the sampling gate generator 52 serves to reset the integrator to zero, while the trailing edge causes it to read out.

The readout from the integrator 50 is applied through a plurality of lines indicated at 53 to a conventional digital number comparator 54. The binary circuits of the number comparator 54 are conventionally connected in such a manner that when a number greater than $N_2$ is read into it, a readout appears on line 56, or when a number less than $N_1$ is applied to is, a readout appears on line 58.

The lines 56 and 58 constitute the two inputs to a reversible counter 60. The reversible counter 60 is shown as having four outputs for energizing a bank of four relays 62. Any number of outputs and relays may be used, depending on the system requirements. The binary circuits of the reversible counter 60 are established so that each pulse applied through the line 58 causes it to count once in one direction, while the pulse applied through line 56 produces a count in the opposite direction. The reversible counter 60 is provided with "stops" so that it can count up or down only to the limit established by the number of outputs.

The bank of relays 62, each operating contacts *64a–64d*, is connected across particular binary outputs of the reversible counter. Each of the contacts *64a–64d* serves when closed to short-circuit a respective feedback resistor *66a–66d*. These series-connected resistors *66a–66d* in series with a resistor 68 constitute the negative feedback for the variable gain amplifier 15. With all of the contacts *64a–64d* open, all of the resistors *66a–66d* are in the feedback loop, and hence the negative feedback across the amplifier 15 is minimum and the gain of the amplifier 15 is maximum. This is a condition which will occur when the numebr applied to the number comparator exceeds $N_2$ a certain number of times. Each time the difference is less than $N_1$, the contacts *64a–64d* will be closed one at a time to sequentially short-circuit the resistors *66a–66d* and thereby increase the negative feedback for amplifier 15 towards a maximum and descreasing its gain towards a minimum. The gain of the system is stabilized when the difference in number of advance and retard pulses is between $N_2$ and $N_1$, and no changes are made in the number of contacts opened or closed.

Many other schemes for altering the gain of the servo loop are also known to the prior art. For example, the gain of the servo loop can be varied by adjusting the charging circuitry of the polarity-sensitive integrator. Depending on internal circuitry, this might be accomplished by altering the time constant of the R.C. circuit of the integrator 28. Furthermore, the output of the reversible counter 60 could be analog and used as an AGC source for the amplifier 15.

*Description of FIGURE 2*

The function of the retard and advance pulse gates 46 and 48 is to pass one pulse for each train of pulses applied to it. Both of these gates are identical so that only the advance pulse gate 48 need be described.

The advance pulse gate 48 comprises an AND gate 70 having a first input terminal 72 and a second input terminal 74. Terminal 72 is suplied with the output from the AND gate 22, while terminal 74 is supplied from the "feedback" line 76 of a flip-flop 78. The output line 47 of flip-flop 78 provides the input to the algebraic integrator 50.

The flip-flop 78 also has two inputs. The output from the AND gate 70 is applied to the first input 80. The output from the reset generator 44 is applied to the second input 82.

Initially, the flip-flop 78 is established so that there is a "1" output at 76 and a "0" output at 47. Since the output at line 76 is fed back, a "1" is present at the second input terminal 74 of AND gate 70. When the first "1" pulse of a train of pulses is applied from the AND gate 22 to the terminal 72, it passes thorugh AND gate 70 and appears at the output 80. This causes the flip-flop 78 to change state so that a "1" output now appears at line 47 and a "0" output appears at line 76. This means a "0" output appears at input terminal 74 of the AND gate 70 which thereafter cannot pass additional pulses until the flip-flop 78 is reset to its initial condition by the application of a reset pulse from the reset generator 44.

Many modifications and adaptations will be apparent to persons skilled in the art. It is intended therefore that this invention be limited only by the following claims as interpreted in the light of the prior art.

I claim:

1. In a servo system for controlling a variable, said servo system comprising a control loop including gain control means and an error sensor generating a polarized error signal output during successive discrete periods, the duration of said error signal output during each successive discrete period representing the magnitude of the deviation of said variable from a reference and the polarity thereof representing the direction of said deviation, said error signal output controlling said variable to null said error, the improvement comprising:

means supplied with said error signal output for generating one polarized pulse during each discrete period, each of said pulses having a polarity representing the polarity of the error output generated during a respective discrete period;

means during a sample period of algebraically integrating said pulses, said sample periods being substantially longer than said discrete periods, whereby said sample period includes a plurality of said discrete periods; and means responsive to the magnitude of the algebraic integration of said polarized pulses for generating a gain control voltage, said gain control voltage being applied to said gain control means in said control loop for controlling the gain of said servo loop.

2. The invention as defined in claim 1 wherein said means responsive to the magnitude of the algebraic summation of said pulses for generating a gain control voltage comprises a number comparator, said number comparator having first and second outputs, said gain control voltage being developed at said first output when the magnitude of said integration is less than $N_1$ and at said second output when the magnitude of said integration exceeds $N_2$, where $N_2$ is a magnitude greater than $N_1$, and wherein said first and second outputs are coupled to said gain control means, the gain control voltage developed at said first and second outputs oppositely affecting the gain of said loop.

3. The invention as defined in claim 1 wherein said gain control means in said loop includes a variable gain amplifier having a negative feedback impedance variable in response to the application of said gain control voltage.

4. The invention as defined in claim 1 wherein said integrator is digital, and wherein said gain control means comprises:

am amplifier, said amplifier having its input and output connected in said loop;

a plurality of resistors connected between said input and said output to provide a negative feedback path across said amplifier;

a plurality of relays, one for each resistor, the contacts of said relays when closed short-circuiting a respective resistor to increase the negative feedback of said amplifier and thereby reduce its gain;

a number comparator having first and second outputs, said gain control voltage being developed at said first output when the integration of the numbers of counted polarized pulses is less than $N_1$ and at said second output when the summation of the number of counted pulses exceeds $N_2$, where $N_2$ is any number greater than $N_1$; and means responsive to the gain control voltage developed at said second output sequentially opening said contacts and at the first output for sequentially closing said contacts.

5. The invention as defined in claim 1 wherein said variable is an oscillator and wherein said error signal output is comprised of a plurality of pulses, the number of said pulses representing the magnitude of the deviation, pulses of positive polarity representing oscillator frequency deviation in one direction and pulses of negative polarity representing oscillator frequency deviation in the opposite direction.

6. The invention as defined in claim 5 wherein said algebraic integration of said polarized pulses is digital, and wherein said means responsive to the magnitude of said algebraic integration is a digital number comparator, the output from said comparator being coupled to said gain control means through two lines, the output appearing at said one line and decreasing said gain when said integration is less than a predetermined level $N_1$, the output appearing at said other line and increasing said gain when said integration exceeds a predetermined level $N_2$, where $N_1$ and $N_2$ are numbers representing the difference in the number of positive and negative error pulses developed during said sampling period, and wherein $N_2$ is greater than $N_1$.

7. The invention as defined in claim 5 wherein said algebraic integration of said polarized pulses is digital, and wherein said means responsive to the magnitude of said algebraic integration is a digital number comparator, the output from said comparator being coupled to said gain control means through two lines, said gain control means including a reversible counter having two inputs coupled to said first and second lines, respectively, said reversible counter counting in one direction upon the application of the output from said comparator to one input and in the opposite direction to the other input, the output appearing at said one line when said integration is less than a predetermined level $N_1$, the output appearing at said other line when said integration exceeds a predetermined level $N_2$, where $N_1$ and $N_2$ are numbers representing the difference in the number of positive and negative error pulses developed during said sampling period, and wherein $N_2$ is greater than $N_1$.

No references cited.

ROY LAKE, *Primary Examiner.*

SIEGFRIED H. GRIMM, *Assistant Examiner.*